United States Patent
Kudo et al.

(10) Patent No.: US 10,327,003 B2
(45) Date of Patent: Jun. 18, 2019

(54) BLOCK SIZE DETERMINATION METHOD, VIDEO ENCODING APPARATUS, AND PROGRAM

(71) Applicant: NIPPON TELEGRAPH AND TELEPHONE CORPORATION, Tokyo (JP)

(72) Inventors: Shinobu Kudo, Yokosuka (JP); Masaki Kitahara, Yokosuka (JP); Atsushi Shimizu, Yokosuka (JP); Hiroshi Fujii, Yokosuka (JP); Mayuko Watanabe, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 818 days.

(21) Appl. No.: 14/781,255

(22) PCT Filed: Mar. 18, 2014

(86) PCT No.: PCT/JP2014/057372
§ 371 (c)(1),
(2) Date: Sep. 29, 2015

(87) PCT Pub. No.: WO2014/162871
PCT Pub. Date: Oct. 9, 2014

(65) Prior Publication Data
US 2016/0057433 A1 Feb. 25, 2016

(30) Foreign Application Priority Data

Apr. 2, 2013 (JP) .................................. 2013-077258

(51) Int. Cl.
*H04N 19/176* (2014.01)
*H04N 19/196* (2014.01)
(Continued)

(52) U.S. Cl.
CPC ......... *H04N 19/176* (2014.11); *H04N 19/119* (2014.11); *H04N 19/157* (2014.11);
(Continued)

(58) Field of Classification Search
CPC .................................................... H04N 19/176
See application file for complete search history.

(56) References Cited

U.S. PATENT DOCUMENTS

| | | | |
|---|---|---|---|
| 2013/0034171 A1 | 2/2013 | Winken et al. | |
| 2013/0039423 A1* | 2/2013 | Helle | H04N 19/197 375/240.13 |
| 2014/0050263 A1* | 2/2014 | Kim | H04N 19/00763 375/240.13 |

FOREIGN PATENT DOCUMENTS

| | | |
|---|---|---|
| AU | 2011280629 A1 | 2/2013 |
| WO | 2012/011432 A1 | 1/2012 |

OTHER PUBLICATIONS

Mathew, Reji, et al., "Quad-Tree Motion Modeling with Leaf Merging," IEEE Transactions on Circuits and Systems for Video Technology, vol. 20, No. 10, Oct. 2010, pp. 1331-1345.
Chang, Yueh-Lun, et al., "Motion Compensated Error Concealment for HEVC Based on Block-Merging and Residual Energy," 20th International Packet Video Workshop, Dec. 12, 2013.
(Continued)

*Primary Examiner* — Rowina J Cattungal
(74) *Attorney, Agent, or Firm* — Harness, Dickey & Pierce, P.L.C.

(57) ABSTRACT

The computational complexity when a block configuration in an encoding target region is determined is reduced while the degradation of coding efficiency is suppressed. A video encoding apparatus includes a block selecting unit which selects each of blocks obtained by recursively dividing an encoding target block as a target block in a predetermined sequence, a block size acquiring unit which acquires the smallest block size in an adjacent block for the selected target block, an evaluation value calculating unit which calculates an evaluation value of the target block if a block (Continued)

size of the target block matches any one of the acquired block size, the block size one level higher than the acquired block size, and the block size one level lower than the acquired block size, and a block configuration determining unit which determines a combination of the blocks constituting the region within the encoding target block based on the evaluation value.

11 Claims, 17 Drawing Sheets

(51) Int. Cl.
*H04N 19/119* (2014.01)
*H04N 19/172* (2014.01)
*H04N 19/157* (2014.01)
*H04N 19/187* (2014.01)
*H04N 19/96* (2014.01)
*H04N 19/30* (2014.01)

(52) U.S. Cl.
CPC ......... *H04N 19/172* (2014.11); *H04N 19/187* (2014.11); *H04N 19/197* (2014.11); *H04N 19/198* (2014.11); *H04N 19/96* (2014.11); *H04N 19/30* (2014.11)

(56) References Cited

OTHER PUBLICATIONS

Extended Search Report, European Patent Application No. 14779132.1, dated Jun. 27, 2016.
Xiang Li, Jicheng An, Xun Guo, Shawmin Lei, "Adaptive CU Depth Range", Joint Collaborative Team on Video Coding (JCT-VC) of ITU-T SG16 WP3 and ISO/ IEC JTC1/SC29/WG11 5th Meeting: Geneva, CH, Mar. 16-23, 2011, [JCTVC-E090].
Il-Koo Kim, Ken McCann, Kazuo Sugimoto, Benjamin Bross, Woo-Jin Han, "HM9: High Efficiency Video Coding (HEVC) Test Model 9 Encoder Description", Joint Collaborative Team on Video Coding (JCT-VC) of ITU-T SG16 WP3 and ISO/IEC JTC1/SC29/WG11 11th Meeting: Shanghai, CN, Oct. 10-19, 2012, [JCTVC-K1002v2], Section 4.7.3.
Xiaolin Shen, Lu Yu, Jie Chen, "Fast coding unit size selection for HEVC based on Bayesian decision rule", 2012 Picture Coding Symposium (PCS), May 7, 2012, pp. 453-456.
Zhe Sheng, Satoshi Goto, "An HEVC CU pruning method based on depth", Proceedings of the 2013 IEICE General Conference, Joho System 2, Mar. 5, 2013 (Mar. 5, 2013), p. 53.
Liquan Shen, Zhi Liu, Xinpeng Zhang, Wenqiang Zhao and Zhaoyang Zhang, "An Effective CU Size Decision Method for HEVC Encoders", IEEE Transactions on Multimedia, Feb. 2013, vol. 15, Issue: 2, pp. 465-470.
International Search Report (in English and Japanese) and Written Opinion of the International Searching Authority (in Japanese) for PCT/JP2014/057372, dated Jun. 17, 2014; ISA/JP.

* cited by examiner

BLOCK SIZE DETERMINATION METHOD, VIDEO ENCODING APPARATUS, AND PROGRAM

TECHNICAL FIELD

This application is a 371 U.S. National Phase of PCT/JP2014/057372 filed on Mar. 18, 2014 and published in Japanese as WO 2014/162871 A1 on Oct. 9, 2014. Priority is claimed to Japanese Patent Application No. 2013-077258, filed Apr. 2, 2013. The entire contents of both applications are incorporated herein by reference.

The present invention relates to a block size determination method, a video encoding apparatus, and a program.

BACKGROUND ART

As technology for coding moving-image data, coding schemes called MPEG-4 and H.264/AVC (hereinafter referred to as H.264) are known. In recent years, standardization work of a coding scheme called high efficiency video coding (HEVC) as the next generation standard is in progress. The HEVC requires larger computational complexity than the conventional H.264, but it is known that the HEVC achieves higher coding efficiency. In this coding scheme, the block configuration within a frame has a hierarchical structure having a higher degree of freedom than the conventional H.264 or the like and the number of candidates for block sizes increases. Hereinafter, a procedure of a determination process of the block configuration in HEVC reference software will be described.

In the HEVC reference software, an image region of an encoding target is divided into units of square blocks called largest coding units (LCUs) of a size of 64 pixels×64 pixels (hereinafter referred to as 64×64) having a hierarchical block configuration and encoding is performed for each LCU. In encoding, it is possible to set a smaller region as an encoding target by iterating a process of recursively dividing the LCU into four equal parts, up to a maximum of three times. When the LCU is 64×64, it is possible to divide a 64×64 region into 32×32, 16×16, and 8×8 regions of a quadtree structure obtained by recursively dividing the region into four parts. That is, the LCU of this case includes regions of four layers. Each of the blocks into which the LCU is divided is referred to as a coding unit (CU), and the LCU can be configured by combining CUs of different block sizes or CUs of the same block size.

FIG. 15 is a diagram illustrating an example in which the LCU is constituted of a combination of a plurality of CUs. In the example illustrated in FIG. 15, the LCU is constituted of a combination of two 32×32 CUs, seven 16×16 CUs, and four 8×8 CUs. When the moving-image data is encoded, it is possible to perform intra prediction or inter prediction and determine a prediction mode for each prediction unit (PU) obtained by further dividing each of the CUs constituting the LCU. In the determination of the block division prediction mode, an evaluation value called an RD cost expressed by the following Formula (1) is generally used.

$$(\text{Evaluation value}) = D + \lambda R \quad (1)$$

In Formula (1), D is an error between a restored signal and an original signal in a prediction mode, R is an information amount, and λ is a Lagrangian parameter. A prediction mode and a combination of CUs with which the evaluation value calculated in Formula (1) is minimized is determined as a final block configuration of the LCU in encoding. When the prediction mode is determined without a block configuration determination process of the LCU being optimized, the prediction mode is determined for each of combinations of CUs within the LCU. In this case, because the computation increases in the process of determining the block configuration of the LCU, the load of this process significantly increases in the entire encoding process and a heavy burden is imposed. Consequently, reducing the load necessary for the process of determining the block configuration of the LCU while suppressing the degradation of the coding efficiency is important from the viewpoint that the computational complexity of the entire encoding process is reduced and such a technique is desired.

To this end, a method for reducing the load by limiting candidates for block sizes serving as selection targets when the block configuration of an LCU is determined has been proposed (for example, Non-Patent Document 1). For example, there is a method for designating block sizes from the block size one level lower than the smallest block size of an adjacent block (PU) to the block size one level larger than the largest block size of the adjacent block as candidates when the block configuration of the LCU is determined.

FIGS. 16A and 16B are diagrams illustrating examples in which the block configuration in an encoding target block is determined based on the block configuration in an adjacent block. FIG. 16A illustrates the case in which the block configuration of the adjacent block includes three 32×32 blocks, three 16×16 blocks, and four 8×8 blocks. In this case, candidates for the block sizes when the block configuration of the encoding target block is determined become 64×64 to 8×8 as illustrated in FIG. 16A. FIG. 16B illustrates the case in which the block configuration of the adjacent block includes four 32×32 blocks. In this case, the candidates for the block sizes when the block configuration of the encoding target block is determined become 64×64 to 16×16 as illustrated in FIG. 16B.

PRIOR ART DOCUMENT

Non-Patent Document

Non-Patent Document 1: "Adaptive CU Depth Range", Joint Collaborative Team on Video Coding (JCT-VC) of ITU-T SG16 WP3 and ISO/IEC JTC1/SC29/WG11, document JCTVC-E090, 5th Meeting. Geneva, Switzerland, 16-23 Mar. 2011

SUMMARY OF INVENTION

Problems to be Solved by the Invention

However, in the above-described method, evaluation values for all layers (all block sizes) are calculated consequently when an encoding target video is a video which is complex and has intense motion across the entire frame or a video shown in fine texture regions across the entire frame and various block sizes are mixed and a plurality of block sizes for an adjacent block are present in the encoding target video. That is, even if candidates for block sizes are limited when the block configuration is determined using the above-described method, there is a problem in that it is impossible to reduce the computational complexity and load because substantially the same computation as the full search is performed.

In view of the above-described circumstances, an object of the present invention is to provide a block size determination method, a video encoding apparatus, and a program capable of reducing the computational complexity when a block configuration in an encoding target region is determined while suppressing the degradation of coding efficiency.

Means for Solving the Problems

An aspect of the present invention is a video encoding apparatus which determines sizes of blocks constituting a region within an encoding target block for encoding target blocks into which an image region is divided in video encoding, the video encoding apparatus including: a block selecting unit which selects each of blocks obtained by recursively dividing the encoding target block as a target block in a predetermined sequence; a block size acquiring unit which acquires the smallest block size in an adjacent block for the selected target block; an evaluation value calculating unit which calculates an evaluation value of the target block if a block size of the target block matches any one of the acquired block size, the block size one level higher than the acquired block size, and the block size one level lower than the acquired block size; and a block configuration determining unit which determines a combination of the blocks constituting the region within the encoding target block based on the evaluation value.

In addition, preferably, in the video encoding apparatus, the sequence is a sequence which starts from the largest block size in the encoding target block, and the video encoding apparatus further includes: a sum calculating unit which calculates evaluation values of blocks into which the target block is divided and calculates a sum of the calculated evaluation values; and a calculation target excluding unit which excludes blocks obtained by dividing the target block from calculation targets of the evaluation values if the evaluation value of the target block is less than the sum.

In addition, preferably, in the video encoding apparatus, the sequence is a sequence which starts from the smallest block size in the encoding target block, and the video encoding apparatus further includes: a combination determining unit which determines a combination of blocks constituting a region within the target block based on the evaluation value; and a calculation target excluding unit which excludes a block which includes the target block and is present in a layer higher than that of the target block from a calculation target of the evaluation value if the determined combination of the blocks within the target block is a combination of a plurality of blocks into which the target block is divided.

In addition, preferably, in the video encoding apparatus, the sequence is a first sequence which starts from the largest block size in the encoding target block or a second sequence which starts from the smallest block size in the encoding target block, and the block selecting unit determines which of the first sequence and the second sequence is to be used for selecting the target block based on the smallest block size in a block adjacent to the encoding target block.

In addition, preferably, in the video encoding apparatus, the sequence is a first sequence which starts from the largest block size in the encoding target block or a second sequence which starts from the smallest block size in the encoding target block, and the block selecting unit determines which of the first sequence and the second sequence is to be used for selecting the target block based on a picture type of the encoding target block.

In addition, an aspect of the present invention is a block size determination method for determining sizes of blocks constituting a region within an encoding target block for encoding target blocks into which an image region is divided in video encoding, the block size determination method including: a step of selecting each of blocks obtained by recursively dividing the encoding target block as a target block in a predetermined sequence; a step of acquiring the smallest block size in an adjacent block for the selected target block; a step of calculating an evaluation value of the target block if a block size of the target block matches any one of the acquired block size, the block size one level higher than the acquired block size, and the block size one level lower than the acquired block size; and a step of determining a combination of the blocks constituting the region within the encoding target block based on the evaluation value.

In addition, an aspect of the present invention is a program for causing a computer to execute the block size determination method.

Advantageous Effects of the Invention

In accordance with the present invention, it is possible to reduce the number of blocks for which evaluation values are to be calculated by selecting the blocks for which the evaluation values are calculated based on the smallest block size in a block adjacent to a target block. At this time, because the blocks for which the evaluation values are to be calculated are selected in accordance with the size of the adjacent block, it is possible to reduce the computational complexity when a block configuration in an encoding target region is determined while suppressing the degradation of coding efficiency.

MODES FOR CARRYING OUT THE INVENTION

Hereinafter, a block size determination method, a video encoding apparatus, and a program in embodiments of the present invention will be described with reference to the drawings. It is to be noted that although an example of HEVC will be described, the present invention may be applied to video coding other than the HEVC. That is, it is possible to apply the present invention to all coding schemes of dividing a video or image region of an encoding target based on a hierarchical block configuration as in the HEVC.

Here, an overview of a process in each embodiment will be described. The following processing is sequentially performed on a CU which is each target block included in an LCU which is an encoding target block. The smallest block size in a block (hereinafter referred to as an adjacent block) adjacent to a target block is acquired. Block sizes for which evaluation values are calculated in the target block are limited to a maximum of three block sizes including: a block size which is the same as the acquired smallest block size in the adjacent block; a block size one level higher than the smallest block size; and a block size one level lower than the smallest block size. It is to be noted that it is assumed here that the present invention is applied to the HEVC, and thus a maximum of three block sizes among 64×64, 32×32, 16×16, and 8×8 are selected as the block sizes. The block sizes selected based on the smallest block size in the adjacent block serve as initial candidates.

The calculation and comparison of evaluation values for one or two layers among the initial candidates are performed, and the candidates for the block sizes for which the evaluation values are calculated are further limited in accordance with the comparison result. In addition, a method for limiting the candidates for the block sizes is switched and applied in accordance with an attribute or the like of the adjacent block and/or the target block. It is to be noted that the adjacent block refers to any or all of a block adjacent to an upper side of the encoding target block (hereinafter, also referred to as a target block), a block adjacent to a left side thereof, and a plurality of adjacent peripheral blocks. It is to be noted that blocks serving as adjacent blocks may be appropriately switched.

First Embodiment

Figure 1:
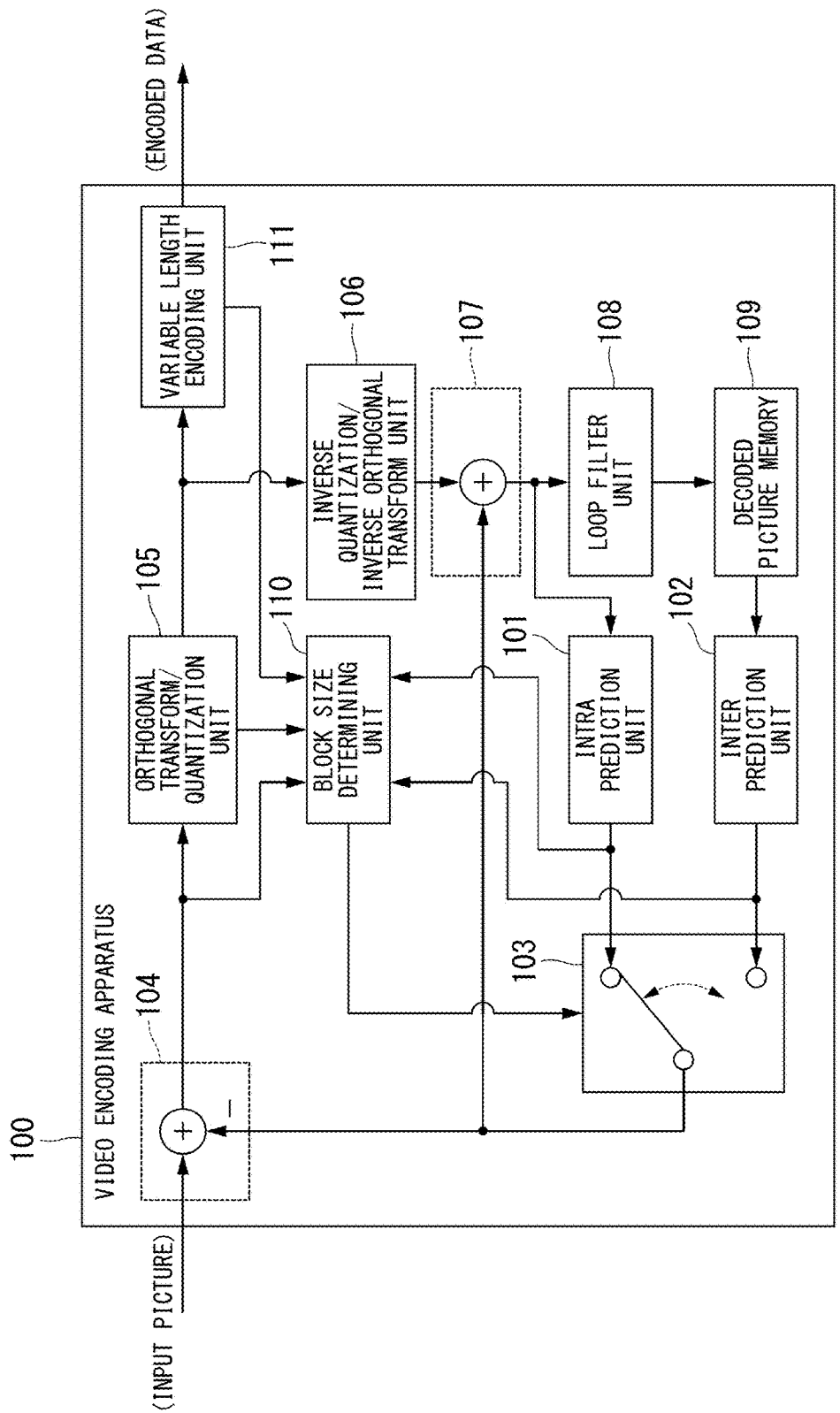
FIG. 1 is a block diagram illustrating a configuration of a video encoding apparatus 100 in a first embodiment.

FIG. 1 is a block diagram illustrating a configuration of a video encoding apparatus 100 in the first embodiment. The video encoding apparatus 100 inputs a video signal indicating pictures (encoding target video), divides an image region of each frame of the input video signal into a plurality of blocks, performs encoding for each block, and outputs a bitstream of an encoding result as encoded data. It is to be noted that the video includes a still image and a moving image.

The video encoding apparatus 100 includes an intra prediction unit 101, an inter prediction unit 102, an intra/inter-selection switch 103, a prediction residual signal generating unit 104, an orthogonal transform/quantization unit 105, an inverse quantization/inverse orthogonal transform unit 106, a restored signal generating unit 107, a loop filter unit 108, a decoded picture memory 109, a block size determining unit 110, and a variable length encoding unit 111.

The intra prediction unit 101 receives a restored signal from the restored signal generating unit 107 and generates a predicted signal from the received restored signal. The restored signal is a signal representing a picture obtained by encoding a picture for the encoding target block and then performing decoding on the encoded picture.

The inter prediction unit 102 reads a picture stored in the decoded picture memory 109 and generates a predicted signal from the read picture.

The intra/inter-selection switch 103 selects either of the predicted signal generated by the intra prediction unit 101 and the predicted signal generated by the inter prediction unit 102 based on control of the block size determining unit 110. The intra/inter-selection switch 103 outputs the selected predicted signal to the prediction residual signal generating unit 104.

The prediction residual signal generating unit 104 subtracts the predicted signal output from the intra/inter-selection switch 103 from the video signal input to the video encoding apparatus 100 to calculate a prediction residual signal, which is a difference for a predicted picture. The prediction residual signal generating unit 104 calculates prediction residual signals in units of PUs for an encoding target block LCU of the input picture. The prediction residual signal generating unit 104 outputs a calculated prediction residual signal to the orthogonal transform/quantization unit 105.

The orthogonal transform/quantization unit 105 outputs a signal obtained by performing an orthogonal transform and quantization on the prediction residual signal output from the prediction residual signal generating unit 104, that is, the difference in each PU, to the inverse quantization/inverse orthogonal transform unit 106 and the variable length encoding unit 111.

The inverse quantization/inverse orthogonal transform unit 106 performs inverse quantization and an inverse orthogonal transform on the signal output from the orthogonal transform/quantization unit 105 to thereby inverse transform the signal into a prediction residual signal including an error. The inverse quantization/inverse orthogonal transform unit 106 outputs the prediction residual signal obtained by the inverse transform to the restored signal generating unit 107.

The restored signal generating unit 107 calculates a restored signal corresponding to the encoding target block by adding the prediction residual signal output by the inverse quantization/inverse orthogonal transform unit 106 to the predicted signal selected by the intra/inter-selection switch 103. The restored signal generating unit 107 outputs the calculated restored signal to the intra prediction unit 101 and the loop filter unit 108.

When the restored signal output by the restored signal generating unit 107 for one frame, that is, a restored picture of the encoding target block, is input, the loop filter unit 108 performs loop filtering on this picture. The loop filter unit 108 outputs a picture obtained by performing the loop filtering to the decoded picture memory 109 to cause the obtained picture to be stored. In the decoded picture memory 109, the picture output from the loop filter unit 108 is stored.

The block size determining unit 110 determines the block configuration of the encoding target block based on the predicted signal generated by the intra prediction unit 101, the predicted signal generated by the inter prediction unit 102, the prediction residual signal output by the prediction residual signal generating unit 104, the signal output by the orthogonal transform/quantization unit 105, and the encoded data input from the variable length encoding unit 111. In addition, the block size determining unit 110 controls the intra/inter-selection switch 103 for each block based on the determined block configuration and causes either the predicted signal generated by the intra prediction unit 101 or the predicted signal generated by the inter prediction unit 102 to be output to the prediction residual signal generating unit 104. The block size determining unit 110 determines which predicted signal is to be selected in accordance with the prediction mode of the encoding target block.

The block size determining unit 110 controls the intra/inter-selection switch 103, so that the determined block configuration is reflected in prediction of a subsequent block and picture via the orthogonal transform/quantization unit 105, the inverse quantization/inverse orthogonal transform unit 106, the restored signal generating unit 107, and the like.

The variable length encoding unit 111 converts the signal output from the orthogonal transform/quantization unit 105 into encoded data to externally output the encoded data.

Figure 2:
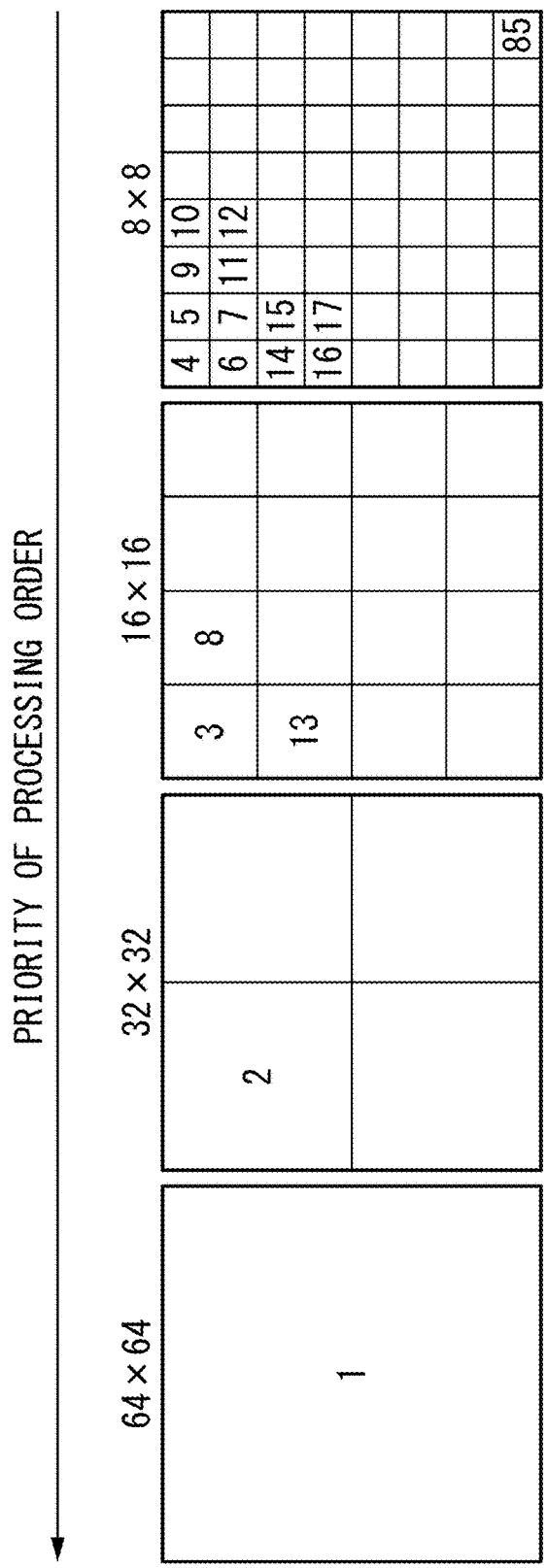
FIG. 2 is a diagram illustrating the priority (sequence) of processing for each block within an LCU in the first embodiment.

Hereinafter, a block size determination process to be performed by the block size determining unit 110 in the present embodiment will be described. FIG. 2 is a diagram illustrating the priority (sequence) of processing for each block within an LCU in the present embodiment. In FIG. 2, a number assigned to each block indicates the priority in which each block becomes a processing target. It is to be noted that in FIG. 2, the illustration of priorities 18 to 84 is omitted. In the present embodiment, processing for the largest block (64×64 block) within the LCU is first performed and processing for each block is sequentially performed along a quadtree structure obtained by recursively dividing the LCU into four equal parts. Performing the process sequentially along the quadtree structure means performing the process in the order in which each node of a quadtree is searched for when each node of the quadtree is associated with a block. The processing sequence illustrated in FIG. 2 corresponds to "pre-order traversal" in the search algorithm. In addition, because the process is performed along the quadtree structure in the block size determination process, the processing sequence for blocks in the same layer is in Z scan order. It is to be noted that the Z scan order for divided blocks refers to raster scan order. When the block is divided into four parts, the process is performed in a "Z" shaped sequence.

Figure 3:
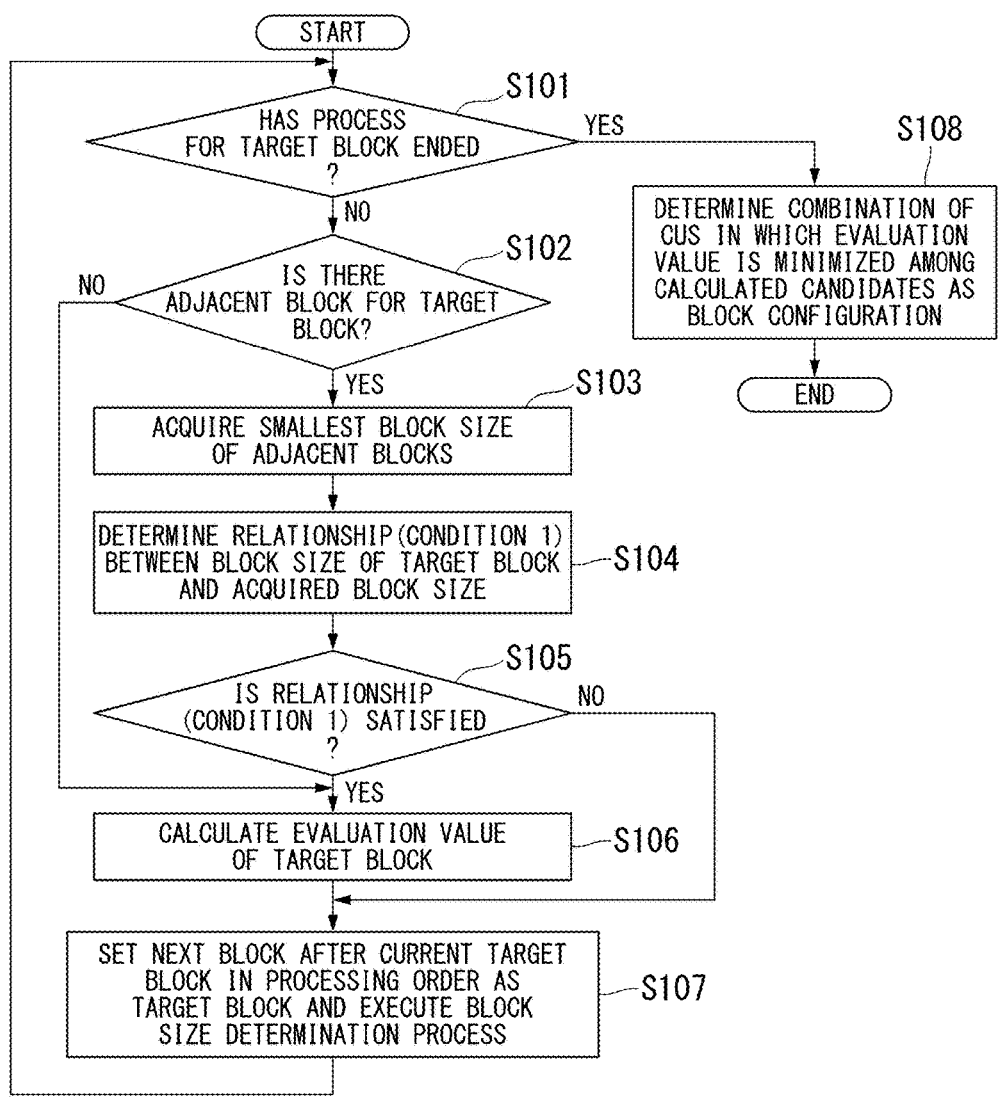
FIG. 3 is a flowchart of a block size determination process to be performed by a block size determining unit 110 in the first embodiment.

FIG. 3 is a flowchart of a block size determination process to be performed by the block size determining unit 110 in the present embodiment. In the present embodiment, after the 64×64 block, which is the largest block size in the LCU, is set as an initial target block, the block size determination process starts. When the block size determination process is started, the block size determining unit 110 determines whether the process has ended for the target block (step S101).

If the process for the target block has not ended (step S101: NO), the block size determining unit 110 determines whether there is an adjacent block for the target block (step S102).

If there is no adjacent block (step S102: NO), the block size determining unit 110 moves the process to step S106.

If there is an adjacent block (step S102: YES), the block size determining unit 110 detects a block having the smallest block size among blocks adjacent to the target block and acquires the block size of the detected block (step S103).

The block size determining unit 110 determines whether a relationship between the block size of the target block and the block size acquired in step S103 satisfies the following condition 1 (step S104).

[Condition 1]: The block size of the target block matches any one of initial candidates including the block size acquired in step S103, the block size one level higher than the acquired block size, and the block size one level lower than the acquired block size.

The block size determining unit 110 determines whether the determination result has satisfied the condition 1 (step S105), moves the process to step S107 if the condition 1 has not been satisfied (step S105: NO), and calculates an evaluation value of the target block (step S106) if the condition 1 has been satisfied (step S105: YES).

In the processing sequence illustrated in FIG. 2, the block size determining unit 110 sets the next block after the current target block as the target block and recursively executes the block size determination process (step S107).

If the processing for the target block has ended in step S101 (step S101: YES), the block size determining unit 110 determines a combination of CUs in which the evaluation value is minimized in the target block as the block configuration in the target block (step S108) and ends the block size determination process. It is to be noted that when the block configuration is determined, a block for which an evaluation value is not calculated is excluded from the target of the combinations of CUs. In addition, when the block size determination process to end is a recursively called block size determination process, the process returns to step S107 of the block size determination process for the immediately preceding block in the processing sequence illustrated in FIG. 2.

Figure 4:
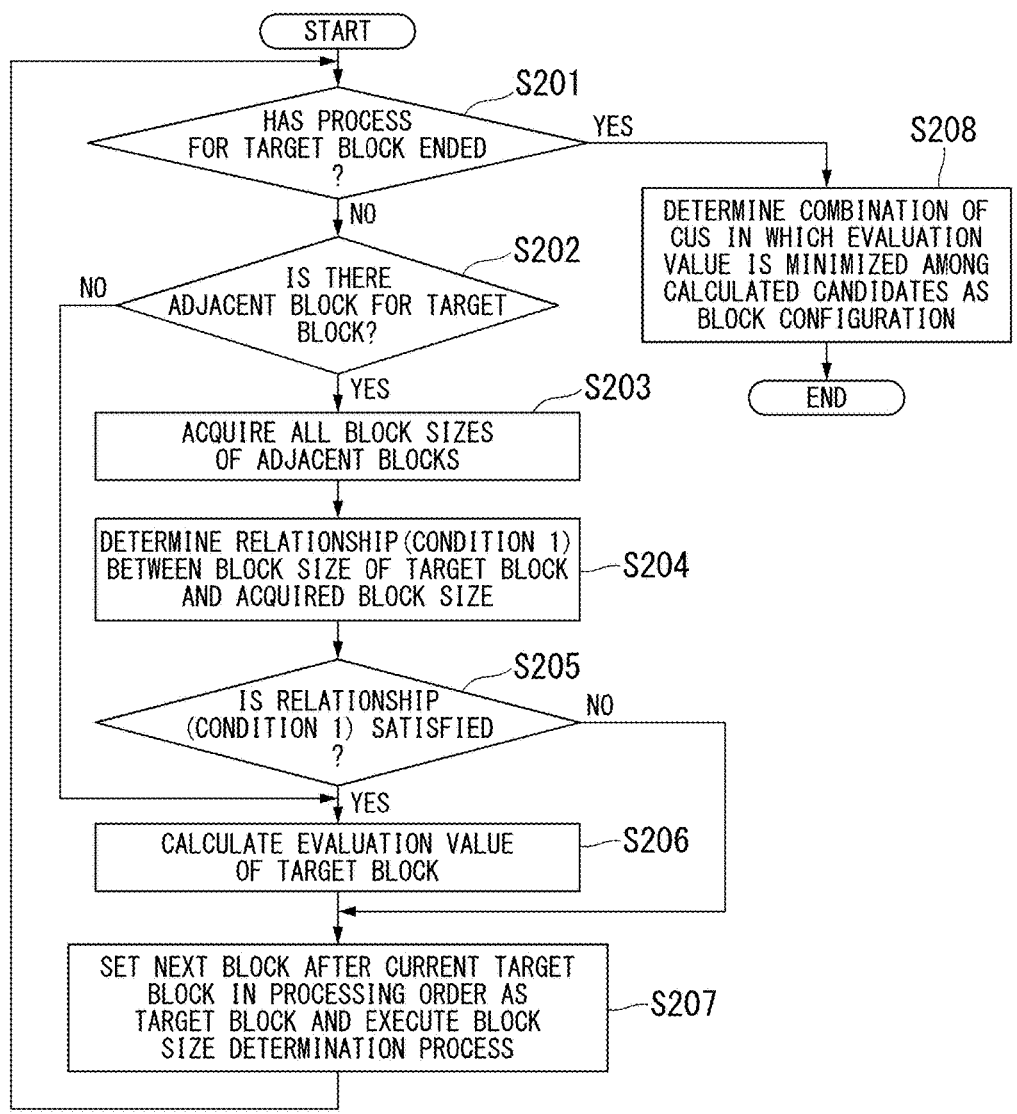
FIG. 4 is a flowchart illustrating a block size determination process in a comparative example.
Figure 16A:
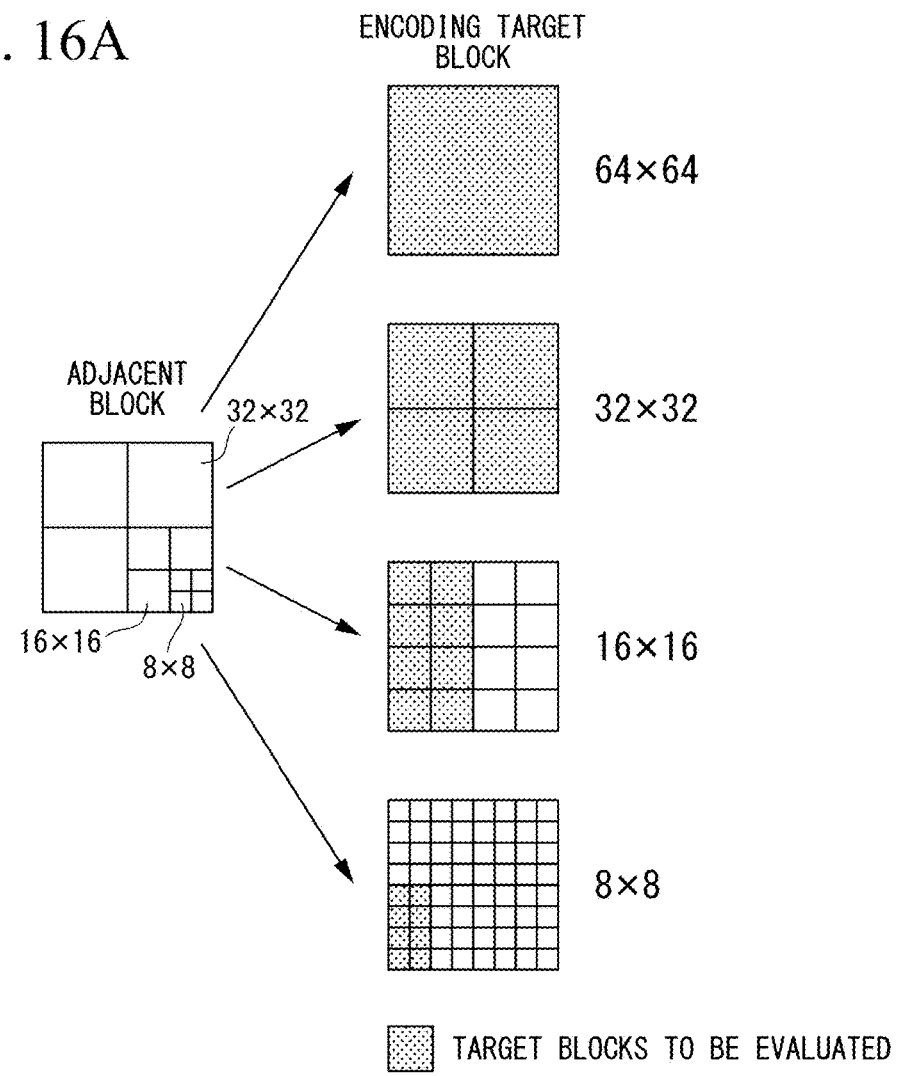
FIG. 16A is a diagram illustrating an example in which a block configuration in an encoding target block is determined based on a block configuration in an adjacent block.
Figure 16B:
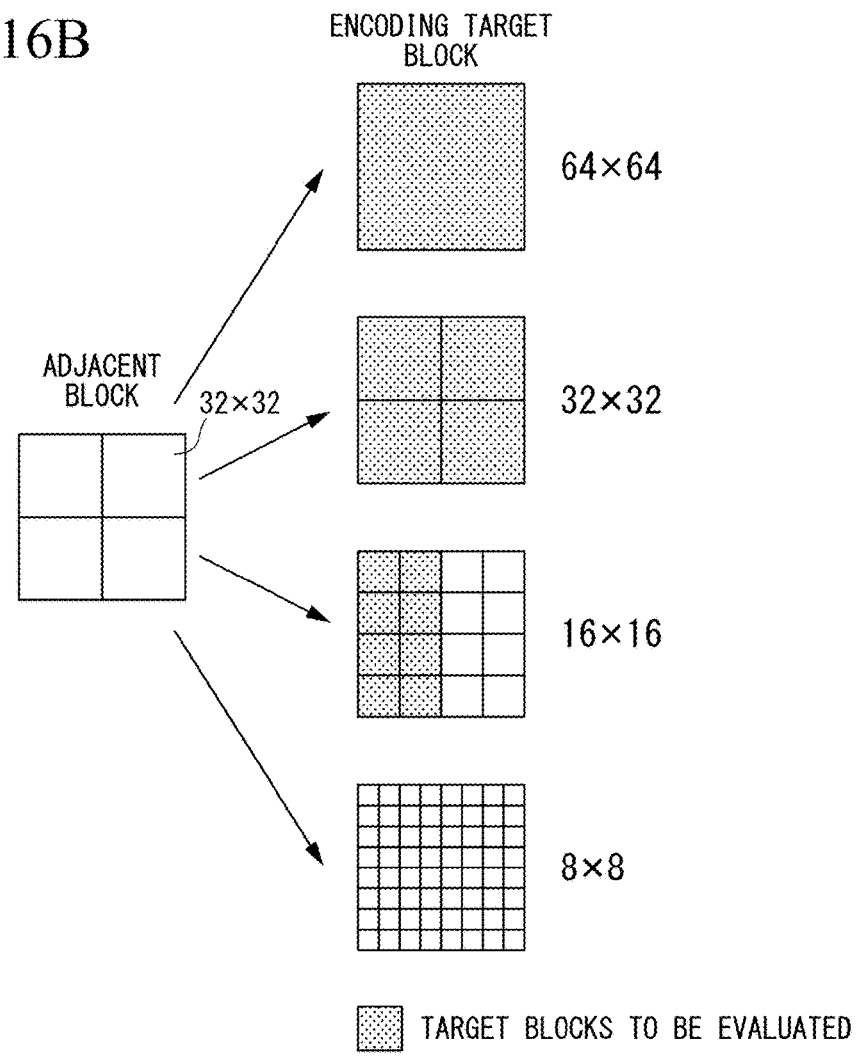
FIG. 16B is a diagram illustrating an example in which a block configuration in an encoding target block is determined based on a block configuration in an adjacent block.

FIG. 4 is a flowchart illustrating a block size determination process as a comparative example for the block size determination process of the present embodiment. The block size determination process of the comparative example is a process when block sizes for which evaluation values are to be calculated are limited as illustrated in FIGS. 16A and 16B. In the block size determination process illustrated in FIG. 4, processing in steps S203 and S204 is different from that of the block size determination process in the present embodiment illustrated in FIG. 3. In step S203, all sizes of blocks adjacent to the target block are acquired. In step S204, it is determined whether the block size of the target block satisfies the condition 1 based on the acquired block sizes. Because all the block sizes of the adjacent blocks are acquired in step S203, there is a possibility that the number of blocks for which evaluation values are to be calculated cannot be reduced.

In contrast, because the smallest block size among the adjacent blocks is acquired and the evaluation value is calculated for the block size in which the condition 1 is satisfied in the block size determination process (FIG. 3) of the present embodiment, it is possible to reduce the number of blocks for which evaluation values are to be calculated and reduce the computational complexity and the load in the block size determination process.

Second Embodiment

The second embodiment is different from the first embodiment in terms of the priority of processing for each block within the LCU. While the process starts from the 64×64 block in the first embodiment, the process in the present embodiment starts from an 8×8 block. It is to be noted that because a video encoding apparatus in the present embodiment has the same configuration as the video encoding apparatus 100 in the first embodiment, a description thereof will be omitted.

Figure 5:
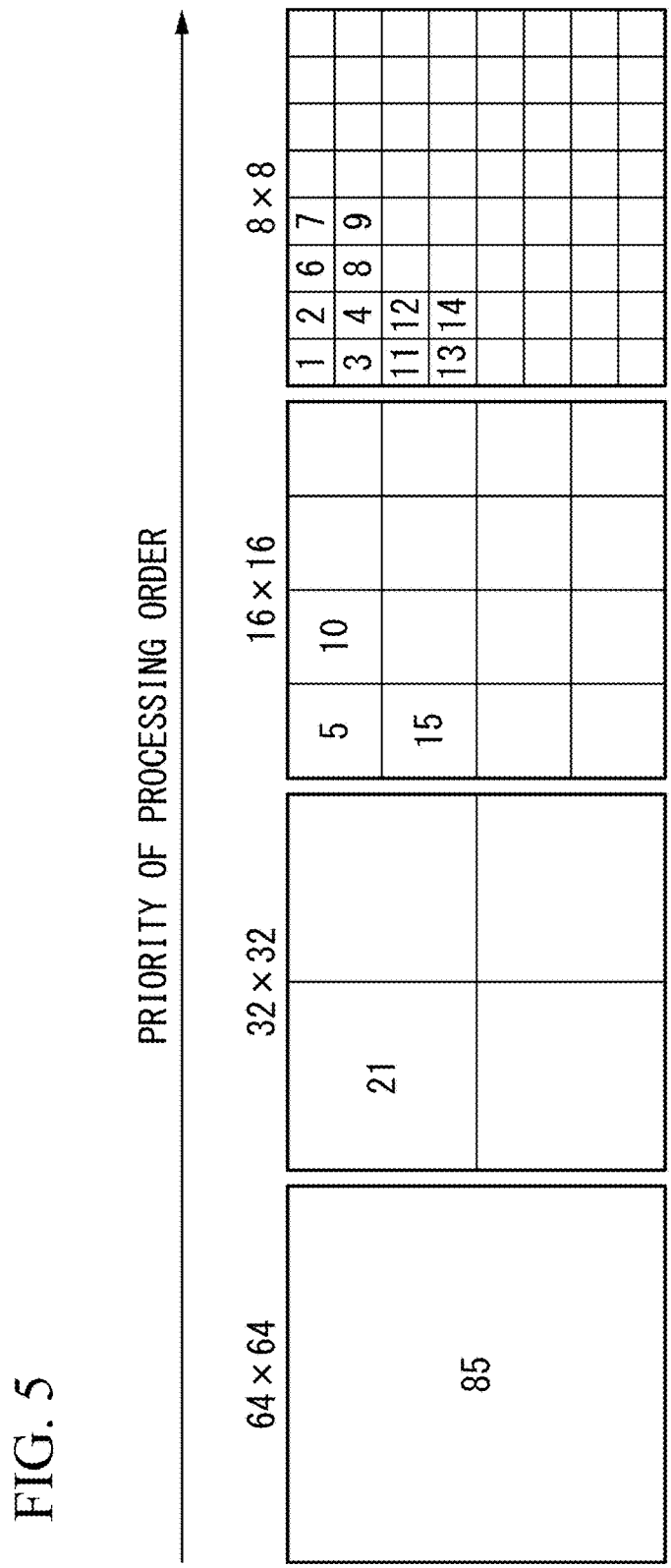
FIG. 5 is a diagram illustrating the priority (sequence) of processing for each block within an LCU in a second embodiment.

FIG. 5 is a diagram illustrating priority (sequence) of processing for each block within an LCU in the second embodiment. In FIG. 5, a number assigned to each block indicates the priority in which each block becomes a processing target. It is to be noted that in FIG. 5, the illustration of priorities 16 to 20 and 22 to 84 is omitted. In the present embodiment, processing for the smallest block (8×8 block) within the LCU is first performed and processing for each block is sequentially performed along the quadtree structure in the LCU. The processing sequence illustrated in FIG. 5 corresponds to "post-order traversal" in the search algorithm for a quadtree.

Specifically, when the process ends for all blocks which are included in the same layer and are included in the same block (parent block) one level higher than the blocks, the block one level higher than the blocks is set as the target block. For example, when processing for the 8×8 blocks "1", "2", "3", and "4" ends (when processing for the 8×8 blocks "1" to "4" included in a 16×16 block ends) in FIG. 5, the 16×16 block "5" is set as the target block.

If there is a block on which the processing does not end among blocks included in the same parent block, this block is set as the target block. In addition, if there is a block for which the processing does not end among blocks into which the target block has been divided in the target block, the divided block is first processed. For example, although a block "10" adjacent to the block "5" is to be set as the target block when the processing of the block "5" ends, processing for 8×8 blocks "6" to "9" is first performed because processing for the 8×8 blocks "6" to "9" into which the block "5" is divided does not end.

Figure 6:
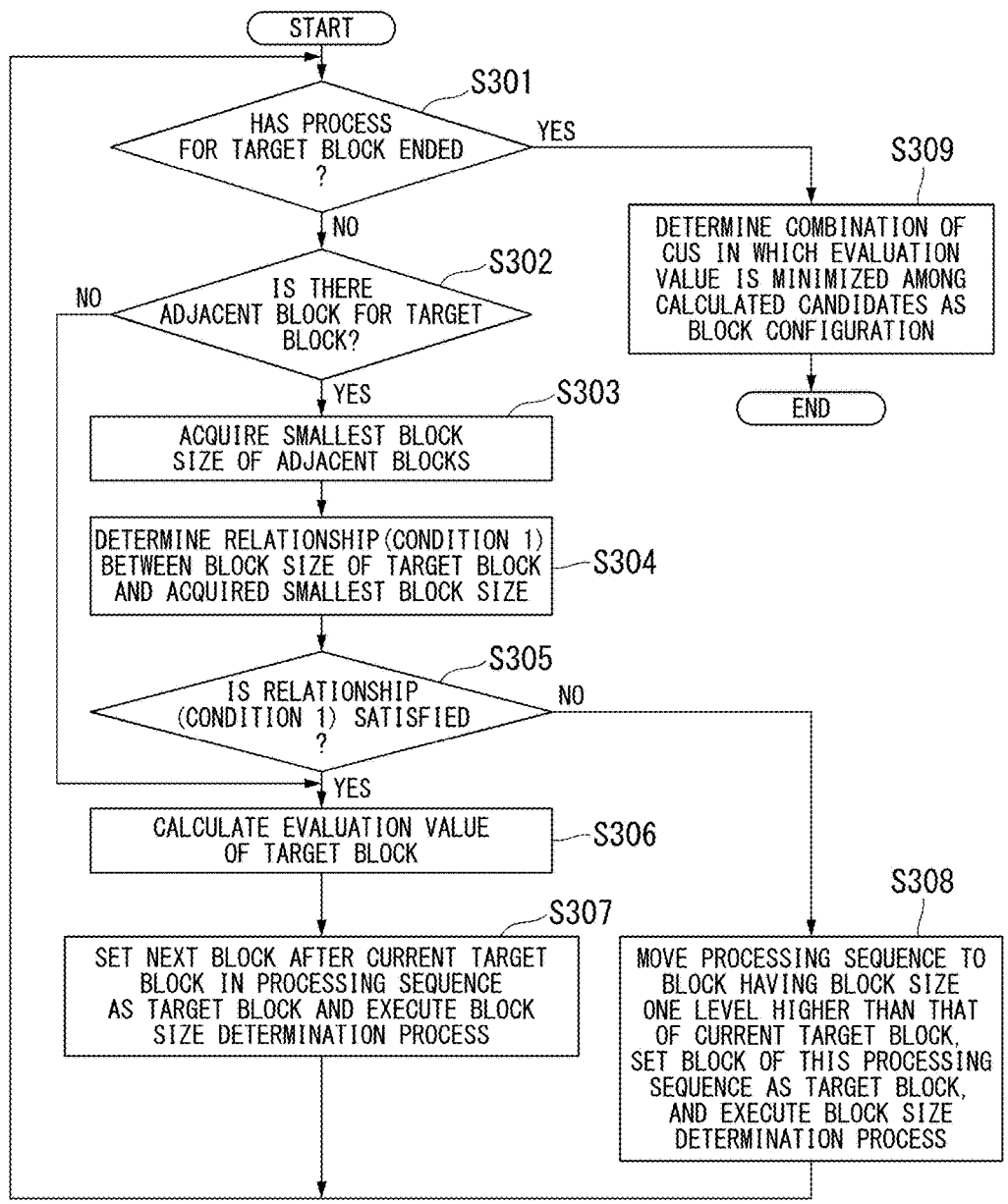
FIG. 6 is a flowchart of a block size determination process to be performed by a block size determining unit 110 in the second embodiment.

FIG. 6 is a flowchart of a block size determination process to be performed by the block size determining unit 110 in the present embodiment. In the present embodiment, a block of the minimum 8×8 block size in the LCU is set as the initial target block, and then the block size determination process is started. When the block size determination process is started, the block size determining unit 110 determines whether calculation of an evaluation value for the target block has been completed (step S301).

If the calculation of the evaluation value for the target block has not ended (step S301: NO), the block size determining unit 110 determines whether there is an adjacent block for the target block (step S302).

If there is no adjacent block (step S302: NO), the block size determining unit 110 moves the process to step S306.

If there is an adjacent block (step S302: YES), the block size determining unit 110 detects a block having the smallest block size among blocks adjacent to the target block and acquires the block size of the detected block (step S303).

The block size determining unit 110 determines whether a relationship between the block size of the target block and the block size acquired in step S303 satisfies the condition 1 shown in the first embodiment (step S304).

The block size determining unit 110 determines whether the determination result satisfies the condition 1 (step S305), and calculates the evaluation value of the target block (step S306) if the condition 1 is satisfied (step S305: YES).

The block size determining unit 110 sets the next block after the current target block in the processing sequence illustrated in FIG. 5 as the target block and recursively executes the block size determination process (step S307).

If the determination result in step S304 indicates that the condition 1 is not satisfied in step S305 (step S305: NO), the block size determining unit 110 moves the processing sequence up to the block size one level higher than the block size of the current target block in the processing sequence illustrated in FIG. 5, sets a block of this processing sequence as the target block, and recursively executes the block size determination process (step S308).

The processing in step S308 is a process of skipping processing for the current target block and blocks having the same parent block as the current target block if the condition 1 is not satisfied, that is, if the smallest block size of the adjacent blocks is a block size two or more levels higher than that of the current target block.

If processing for the target block ends in step S301 (step S301: YES), the block size determining unit 110 determines a combination of CUs in which an evaluation value is minimized in the target block as the block configuration in the target block (step S309) and ends the block size determination process. It is to be noted that when the block configuration is determined, the block in which the evaluation value is not calculated is excluded from the target of the combinations of CUs as in the first embodiment. In addition, if the block size determination process to end is a recursively called block determination process, the process returns to step S307 or S308 from which the process is called. In the present embodiment, the combination of CUs in which the evaluation value is minimized is determined as the block configuration using the evaluation value of the target block and evaluation values of blocks of a layer lower than or equal to that of the target block.

Because the evaluation values are calculated while processing for the block in which the condition 1 is not satisfied being skipped when processing is sequentially performed from the blocks of the smallest block size (8×8) to the block of the largest block size (64×64) along the quadtree structure, it is possible to reduce the number of blocks for which evaluation values are to be calculated and reduce the computational complexity and load in the block size determination process.

Third Embodiment

The block size determination process in the third embodiment is a process in which the block size determination process in the first embodiment is modified. It is to be noted that because the video encoding apparatus in the present embodiment has the same configuration as the video encoding apparatus 100 in the first embodiment, a description thereof will be omitted. In addition, the priority (sequence) of processing for each block in the present embodiment is also the same as that of the first embodiment and is the priority illustrated in FIG. 2.

Figure 7:
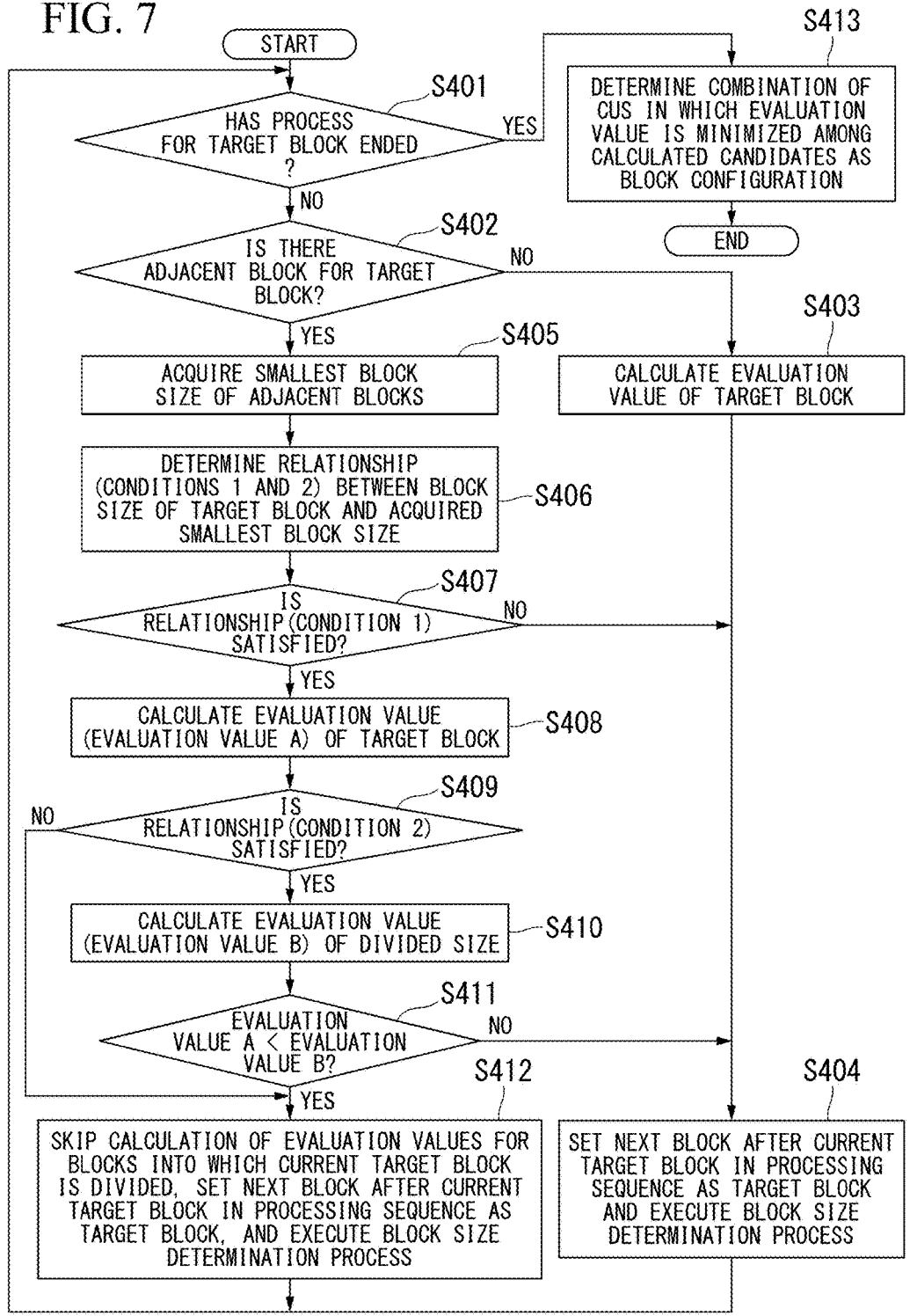
FIG. 7 is a flowchart of a block size determination process to be performed by a block size determining unit 110 in a third embodiment.

FIG. 7 is a flowchart of a block size determination process to be performed by the block size determining unit 110 in the third embodiment. The 64×64 block having the largest block size in the LCU is set as an initial target block, and then the block size determination process is started. When the block size determination process is started, the block size determining unit 110 determines whether processing for the target block has ended (step S401).

If the processing for the target block has not ended (step S401: NO), the block size determining unit 110 determines whether there is an adjacent block for the target block (step S402).

If there is no adjacent block (step S402: NO), the block size determining unit 110 calculates an evaluation value of the target block (step S403) and sets the next block after the current target block in the processing sequence illustrated in FIG. 2 as the target block and recursively executes the block size determination process (step S404).

In contrast, if there is an adjacent block (step S402: YES), the block size determining unit 110 detects a block having the smallest block size among blocks adjacent to the target block and acquires the block size of the detected block (step S405).

The block size determining unit 110 determines whether a relationship between the block size of the target block and the block size acquired in step S405 satisfies the condition 1 shown in the first embodiment and the following condition 2 (step S406).

[Condition 2]: The block size one level lower than the block size of the target block matches any one of initial candidates including the block size acquired in step S405, the block size one level higher than the acquired block size, and the block size one level lower than the acquired block size.

The block size determining unit 110 determines whether the determination result has satisfied the condition 1 (step S407), moves the process to step S404 if the condition 1 has not been satisfied (step S407: NO), and calculates an evaluation value of the target block (step S408) if the condition 1 has been satisfied (step S407: YES).

The block size determining unit 110 determines whether the condition 2 is satisfied (step S409), moves the process to step S412 in the condition 2 is not satisfied (step S409: NO), and calculates the evaluation value when the target block is divided into four parts (step S410) if the condition 2 is satisfied (step S409: YES).

It is to be noted that the evaluation value when the target block is divided into four parts is a sum obtained by adding evaluation values of four divided blocks obtained by dividing the target block into the four parts.

The block size determining unit 110 determines whether the evaluation value (evaluation value A) calculated in step S408 is less than the evaluation value (evaluation value B) calculated in step S410 (step S411).

If the evaluation value A is not less than the evaluation value B (step S411: NO), the block size determining unit 110 moves the process to step S404.

In contrast, if the evaluation value A is less than the evaluation value B (step S411: YES), the block size determining unit 110 skips a process for blocks into which the current target block is divided, sets the next block after the current target block in the processing sequence illustrated in FIG. 2 as the processing target, and recursively executes the block size determination process (step S412). It is to be noted that the next block in step S412 is a block other than blocks obtained by dividing the current target block and has the minimum processing sequence among blocks having processing sequence subsequent to that of the current target block.

If the processing for the target block has ended in step S401 (step S401: YES), the block size determining unit 110 determines a combination of CUs in which the evaluation value is minimized in the target block as the block configuration in the target block (step S413) and ends the block size determination process. It is to be noted that when the block configuration is determined, a block for which an evaluation value is not calculated is excluded from the target of the combinations of CUs as in the first embodiment. In addition, when the block size determination process to end is a recursively called block size determination process, the process returns to step S404 or S412 from which the process is called.

The block size determination process in the present embodiment is different from the block size determination process in the first embodiment in that the determination (step S409) of whether the condition 2 is satisfied and the comparison (step S411) of the evaluation values when the condition 1 is satisfied are added. In the present embodiment, in the processing in step S409, it is determined whether blocks into which the current target block is divided satisfy the condition 1 in advance and processing for lower-layer blocks is skipped if the condition 1 is not satisfied. Thereby, it is possible to further reduce the computational complexity and load than in the block size determination process in the first embodiment.

In addition, in the processing in step S411, the evaluation value (evaluation value A) of the current target block is compared with the evaluation value (evaluation value B) when target blocks are configured with blocks into which the target block is divided and it is determined whether a smaller evaluation value is obtained in a combination of lower-layer blocks. If it is determined that a smaller evaluation value is not obtained even in the combination of the lower-layer blocks, processing for the blocks into which the current target block is divided is skipped. Thereby, it is possible to further reduce the computational complexity and load than in the block size determination process in the first embodiment.

Fourth Embodiment

The block size determination process in the fourth embodiment is a process in which the block size determination process in the second embodiment is modified. It is to be noted that because the video encoding apparatus in the present embodiment has the same configuration as the video encoding apparatus 100 in the first embodiment, a description thereof will be omitted. In addition, the priority (sequence) of processing for each block in the present embodiment is also the same as that of the second embodiment and is the priority illustrated in FIG. 5.

Figure 8:
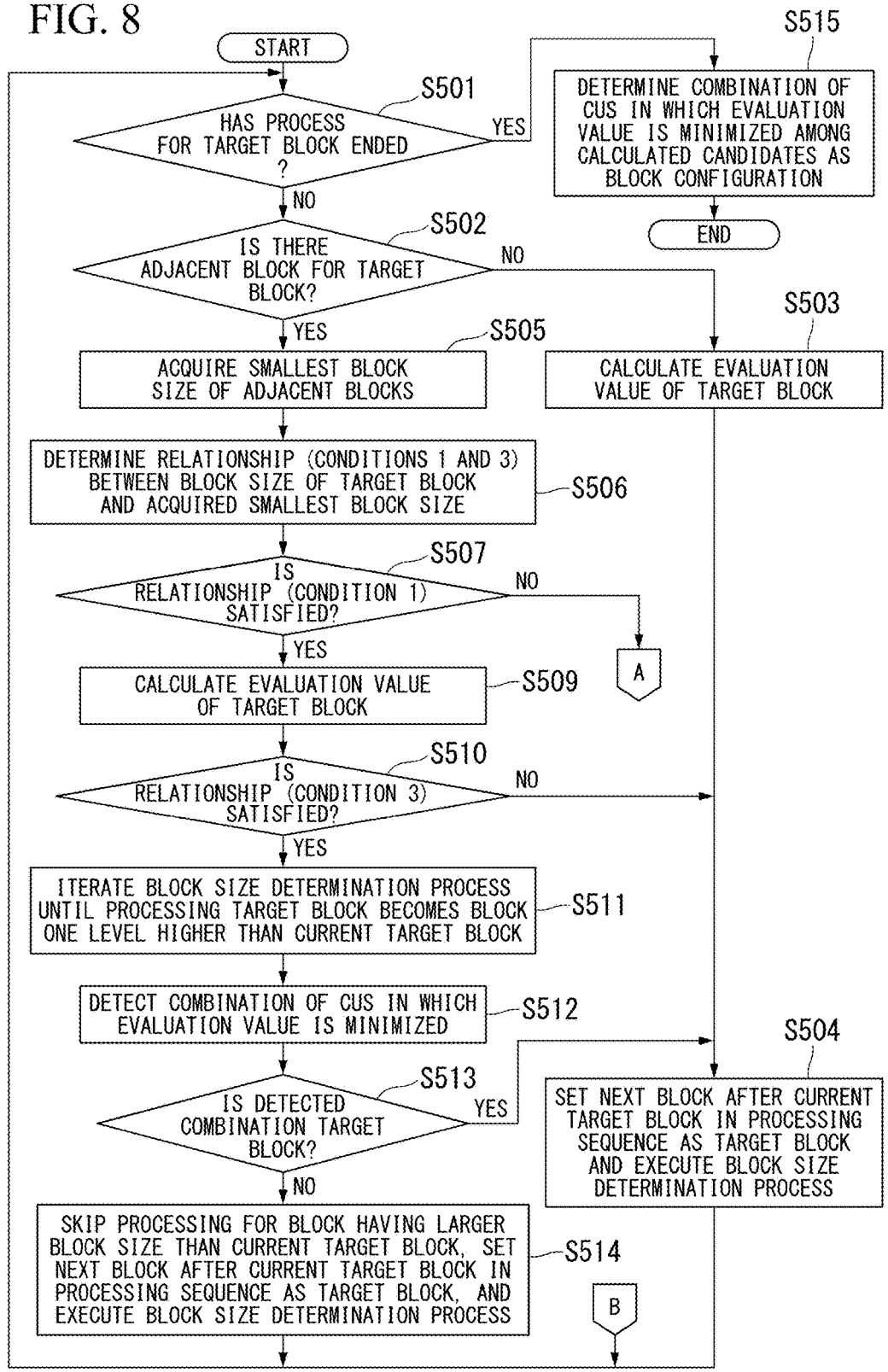
FIG. 8 is a first flowchart of a block size determination process to be performed by a block size determining unit 110 in a fourth embodiment.
Figure 9:
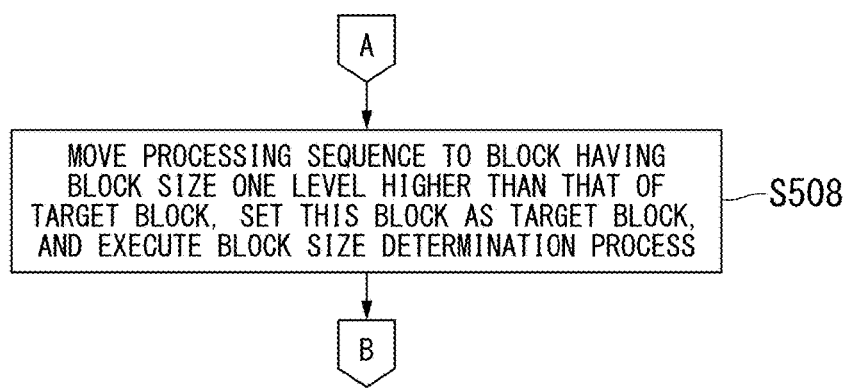
FIG. 9 is a second flowchart of the block size determination process to be performed by the block size determining unit 110 in the fourth embodiment.

FIGS. 8 and 9 are flowcharts of the block size determination process to be performed by the block size determining unit 110 in the fourth embodiment. An 8×8 block having the smallest block size in the LCU is set as an initial target block, and then the block size determination process is started. When the block size determination process is started, the block size determining unit 110 determines whether the processing for the target block has ended (step S501).

If the processing for the target block has not ended (step S501: NO), the block size determining unit 110 determines whether there is an adjacent block for the target block (step S502).

If there is no adjacent block (step S502: NO), the block size determining unit 110 calculates an evaluation value of the target block (step S503) and sets the next block after the current target block in the processing sequence illustrated in FIG. 5 as the target block and recursively executes the block size determination process (step S504).

In contrast, if there is an adjacent block (step S502: YES), the block size determining unit 110 detects a block having the smallest block size among blocks adjacent to the target block and acquires the block size of the detected block (step S505).

The block size determining unit 110 determines whether a relationship between the block size of the target block and the block size acquired in step S505 satisfies the condition 1 shown in the first embodiment and the following condition 3 (step S506).

[Condition 3]: The block size one level higher than the block size of the target block matches any one of initial candidates including the block size acquired in step S505, the block size one level higher than the acquired block size, and the block size one level lower than the acquired block size.

The block size determining unit 110 determines whether the condition 1 has been satisfied (step S507), moves the processing sequence up to the block one level higher than the current target block and sets the block as the target block if the condition 1 has not been satisfied (step S507: NO), and recursively executes the block size determination process (step S508).

In contrast, if the condition 1 has been satisfied (step S507: YES), the block size determining unit 110 calculates the evaluation value of the target block (step S509).

The block size determining unit 110 determines whether the condition 3 has been satisfied (step S510) and moves the process to step S504 if the condition 3 has not been satisfied (step S510: NO).

In contrast, if the condition 3 has been satisfied (step S510: YES), the block size determining unit 110 iterates the block size determination process until the target block becomes the block one level higher than the current target block (step S511).

The block size determining unit 110 detects a combination of CUs in which an evaluation value is minimized when the target block becomes the block one level higher than the current target block (step S512)

The block size determining unit 110 determines whether the combination of CUs detected in step S512 is the current target block (step S513), and moves the process to step S504 if the detected combination of CUs is the current target block (step S513: YES).

In contrast, if the detected combination of CUs is not the current target block (step S513: NO), the block size determining unit 110 skips processing for a block which includes the current target block and has a larger block size than the current target block, sets the next block in the processing sequence as the target block, and recursively executes the block size determination process (step S514). It is to be noted that the next block in step S514 is a block other than a higher-layer block including the current target block and has the minimum processing sequence among blocks having processing sequences subsequent to that of the current target block.

When the processing for the target block has ended in step S501 (step S501: YES), the block size determining unit 110 determines a combination of CUs in which the evaluation value is minimized in the target block as the block configuration in the target block (step S515) and ends the block size determination process. It is to be noted that when the block configuration is determined, a block for which an evaluation value is not calculated is excluded from the target of the combinations of CUs as in the first embodiment. In addition, when the block size determination process to end is a recursively called block size determination process, the process returns to step S504, S508, S511, or S514 from which the process is called.

The block size determination process in the present embodiment is different from the block size determination process in the second embodiment in that the determination (step S510) of whether the condition 3 has been satisfied and the determination (step S513) of whether a combination in which the evaluation value is minimized when the process has proceeded to the block one level higher than the current target block is the block one level higher than the current target block in the case in which the condition 1 has been satisfied are added.

In the present embodiment, in the processing in step S513, it is determined whether the combination in which the evaluation value is minimized is constituted of a target block when the process has proceeded to the block one level higher than the current target block, and a block which includes the target block and is present in a large layer is excluded from the processing target and processing for a higher-layer block is skipped if the combination in which the evaluation value is minimized is not constituted of the target block (step S513: NO). Thereby, it is possible to further reduce the computational complexity and load than in the block size determination process in the second embodiment.

In other words, in the block size determination process in the present embodiment, evaluation values are calculated starting from a block of the smallest block size (8×8) in accordance with the processing sequence illustrated in FIG. 5 along a hierarchical structure of regions represented by a quadtree obtained by recursively dividing an LCU region into four equal parts. At this time, if evaluation values for blocks into which the target block is divided and which are included in the target block have been calculated, a block configuration in which the evaluation value is minimized in the target block is temporarily calculated. At this time, if the block configuration for the target block is constituted of the blocks into which the target block is divided, it is possible to reduce the computational complexity and the load by skipping processing for a block which is present on a higher layer than the target block and which includes the target block and calculation of the evaluation value.

Fifth Embodiment

Figure 10:
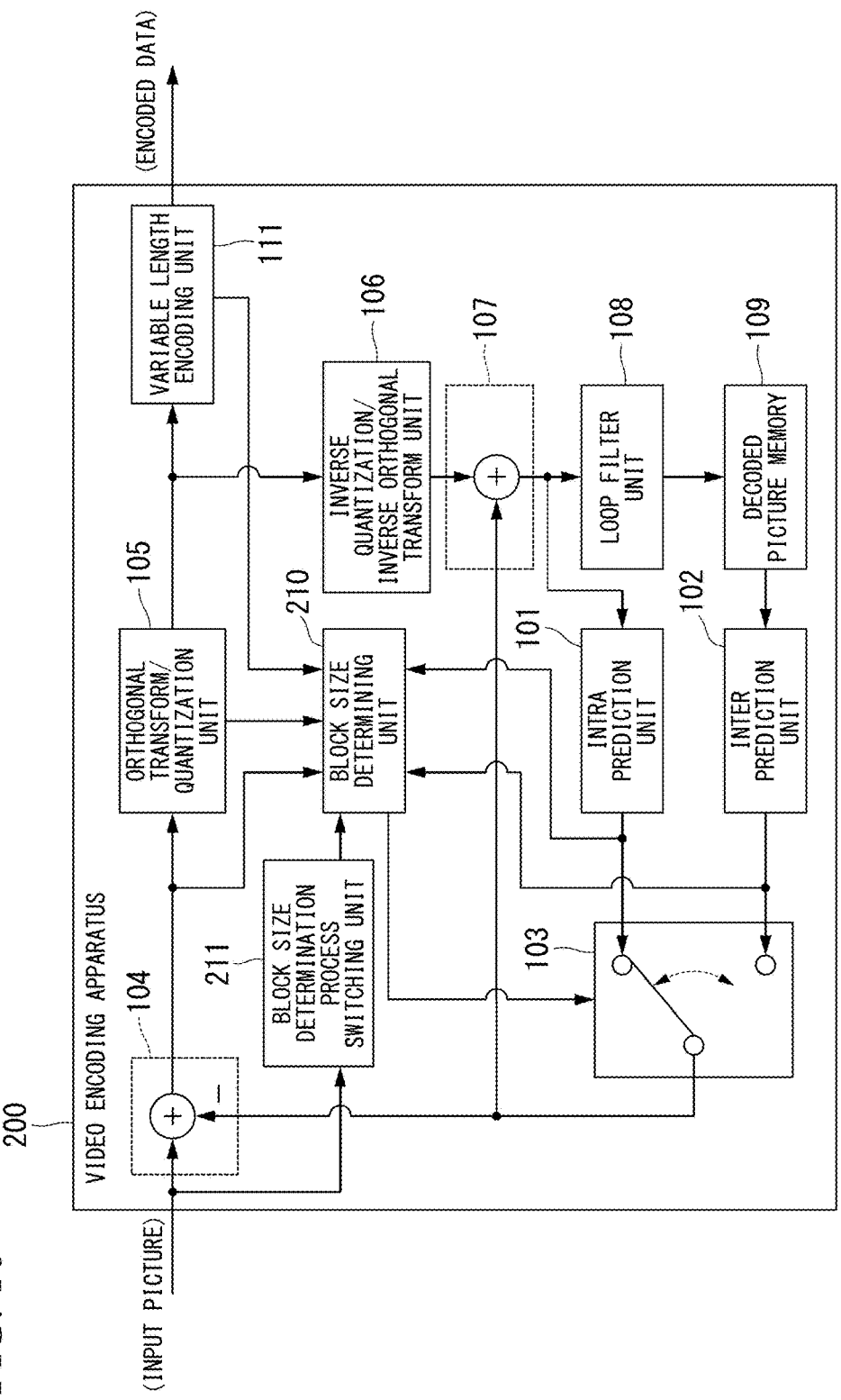
FIG. 10 is a block diagram illustrating a configuration of a video encoding apparatus 200 in a fifth embodiment.

FIG. 10 is a block diagram illustrating a configuration of a video encoding apparatus 200 in the fifth embodiment. Similar to the video encoding apparatus 100 (FIG. 1) in the first embodiment, the video encoding apparatus 200 inputs a video signal representing a picture (encoding target video), divides each frame of the input video signal into a plurality of blocks, performs encoding for each block, and outputs a bitstream of an encoding result as encoded data. It is to be noted that the video includes a still image and a moving image. Hereinafter, the same functional units as those of the video encoding apparatus 100 are assigned the same reference signs and a description thereof will be omitted.

The video encoding apparatus 200 includes an intra prediction unit 101, an inter prediction unit 102, an intra/inter-selection switch 103, a prediction residual signal generating unit 104, an orthogonal transform/quantization unit 105, an inverse quantization/inverse orthogonal transform unit 106, a restored signal generating unit 107, a loop filter unit 108, a decoded picture memory 109, a block size determining unit 210, a variable length encoding unit 111, and a block size determination process switching unit 211. The video encoding apparatus 200 is different from the video encoding apparatus 100 in that the block size determination process switching unit 211 is further provided and the block size determining unit 210 is provided in place of the block size determining unit 110.

Similar to the block size determining unit 110, the block size determining unit 210 determines a block configuration of the encoding target block. It is to be noted that the block size determining unit 210 can execute two types of block size determination processes and determines a block configuration for the LCU by executing either of the two types of block size determination processes in accordance with control of the block size determination process switching unit 211. A combination of the two types of block size determination processes capable of being executed by the block size determining unit 210 is any one of a combination of the block size determination processes in the first and second embodiments, a combination of the block size determination processes in the first and fourth embodiments, a combination of the block size determination processes in the third and second embodiments, and a combination of the block size determination processes in the third and fourth embodiments. In addition, similar to the block size determining unit 110, the block size determining unit 210 controls the intra/inter-selection switch 103 for each block.

Figure 11:
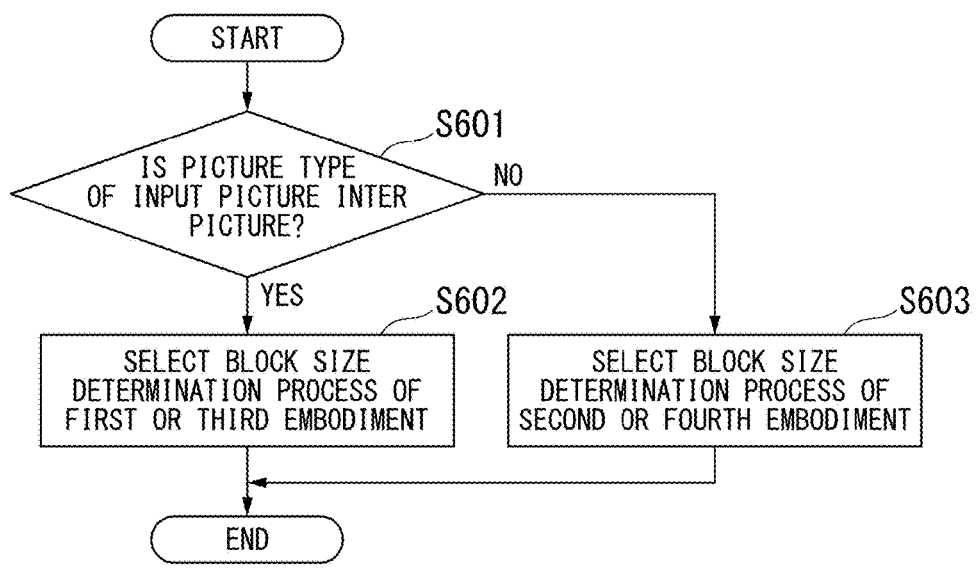
FIG. 11 is a flowchart illustrating a selection process to be performed by a block size determination process switching unit 211 in the fifth embodiment.

The block size determination process switching unit 211 controls for switching the block size determination process to be executed by the block size determining unit 210, based on a picture type (prediction mode) of a picture input to the video encoding apparatus 200. FIG. 11 is a flowchart illustrating a selection process to be performed by the block size determination process switching unit 211 in the present embodiment.

When the selection process starts, the block size determination process switching unit 211 determines whether the picture type of the picture input to the video encoding apparatus 200 is an inter picture (step S601), causes the block size determining unit 210 to execute the block size determination process in the first or third embodiment (step S602) if the picture type is the inter picture (step S601: YES), and causes the selection process to end.

In contrast, if the picture type is not the inter picture (step S601: NO), the block size determination process switching unit 211 causes the block size determining unit 210 to execute the block size determination process in the second or fourth embodiment (step S603), and causes the selection process to end.

Sixth Embodiment

The sixth embodiment is different from the fifth embodiment in a selection process. In the fifth embodiment, the block size determination process is switched in accordance with a picture type of an input picture. In contrast, in the sixth embodiment, the block size determination process is switched in accordance with the presence/absence of an adjacent block and the block size of the adjacent block when a target block has, for example, a 64×64 block size. It is to be noted that because a video encoding apparatus in the present embodiment has the same configuration as the video encoding apparatus 200 in the fifth embodiment, a description thereof will be omitted.

Figure 12:
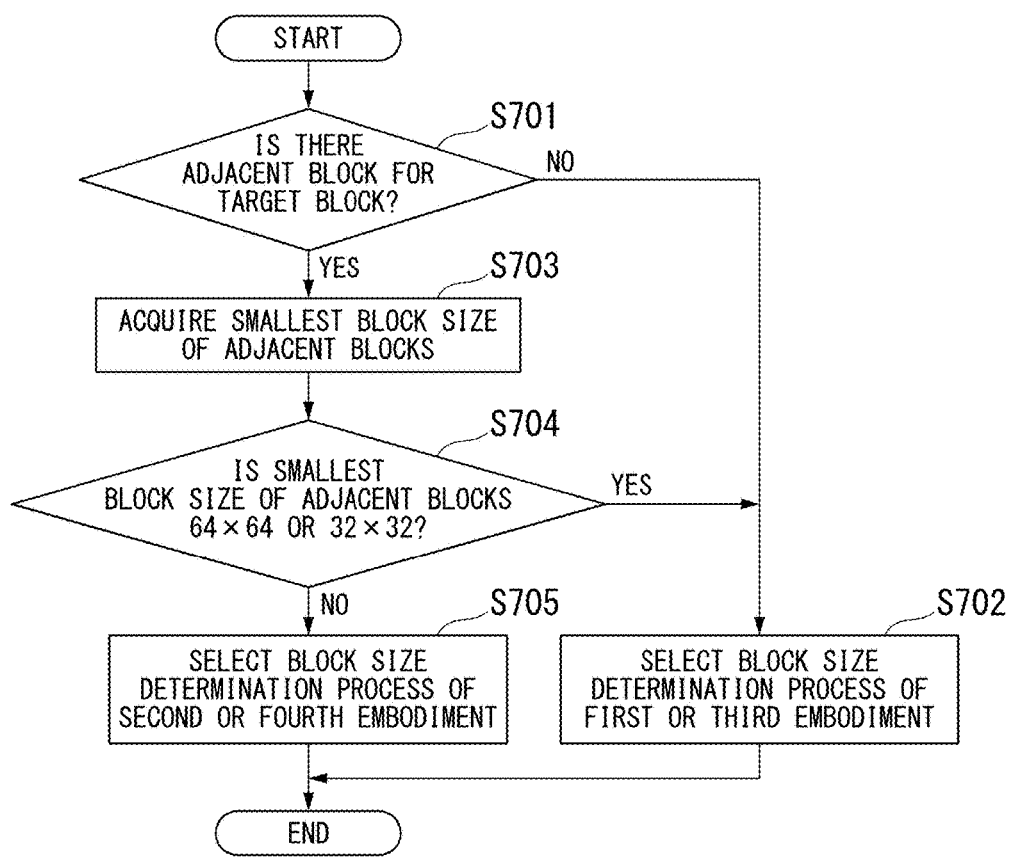
FIG. 12 is a flowchart illustrating a selection process to be performed by a block size determination process switching unit 211 in a sixth embodiment.

FIG. 12 is a flowchart illustrating a selection process to be performed by the block size determination process switching unit 211 in the sixth embodiment.

When the selection process starts, the block size determination process switching unit 211 sets the target block to the 64×64 block size (block size of the LCU), determines whether there is an adjacent block for the target block (step S701), causes the block size determining unit 210 to execute the block size determination process in the first or third embodiment (step S702) if there is no adjacent block (step S701: NO), and causes the selection process to end.

In contrast, if there is an adjacent block (step S701: YES), the block size determination process switching unit 211 causes the block size determining unit 210 to detect a block of the smallest block size among blocks adjacent to the target block and acquires the block size of the detected block (step S703). Next, the block size determination process switching unit 211 determines whether the smallest block size in the blocks adjacent to the target block is a 64×64 or 32×32 block size (step S704).

If the smallest block size is the 64×64 or 32×32 block size (step S704: YES), the block size determination process switching unit 211 moves the process to step S702. If the smallest block size is not the 64×64 and 32×32 block size (step S704: NO), the block size determination process switching unit 211 causes the block size determining unit 210 to execute the block size determination process in the second or fourth embodiment (step S705) and causes the selection process to end.

In this manner, the block size determination process to be executed by the block size determining unit 210 is switched in accordance with the presence/absence of the adjacent block and the block size of the adjacent block, and thus it is possible to switch an initially set target block in the block size determination process and further reduce the computational complexity and load.

It is to be noted that although the configuration in which the size of the target block is set to a 64×64 block size when the selection process starts has been described, the size of the target block may be set to the block size of the LCU when the selection process starts if the block size of the LCU is a size other than the 64×64 block size.

As described above, in the block size determination process in each embodiment, a process of determining whether to calculate the evaluation value of each block and whether to perform the process of calculating the evaluation value are switched based on the smallest block size of the adjacent blocks. In addition, two candidates among a plurality of candidates are first compared with each other and whether to perform processing of a third candidate is determined in accordance with a comparison result. In addition, the block size determination process is switched in accordance with the adjacent block and/or picture type. Thereby, it is possible to reduce the computational complexity when the block configuration in the encoding target region is determined.

Figure 13:
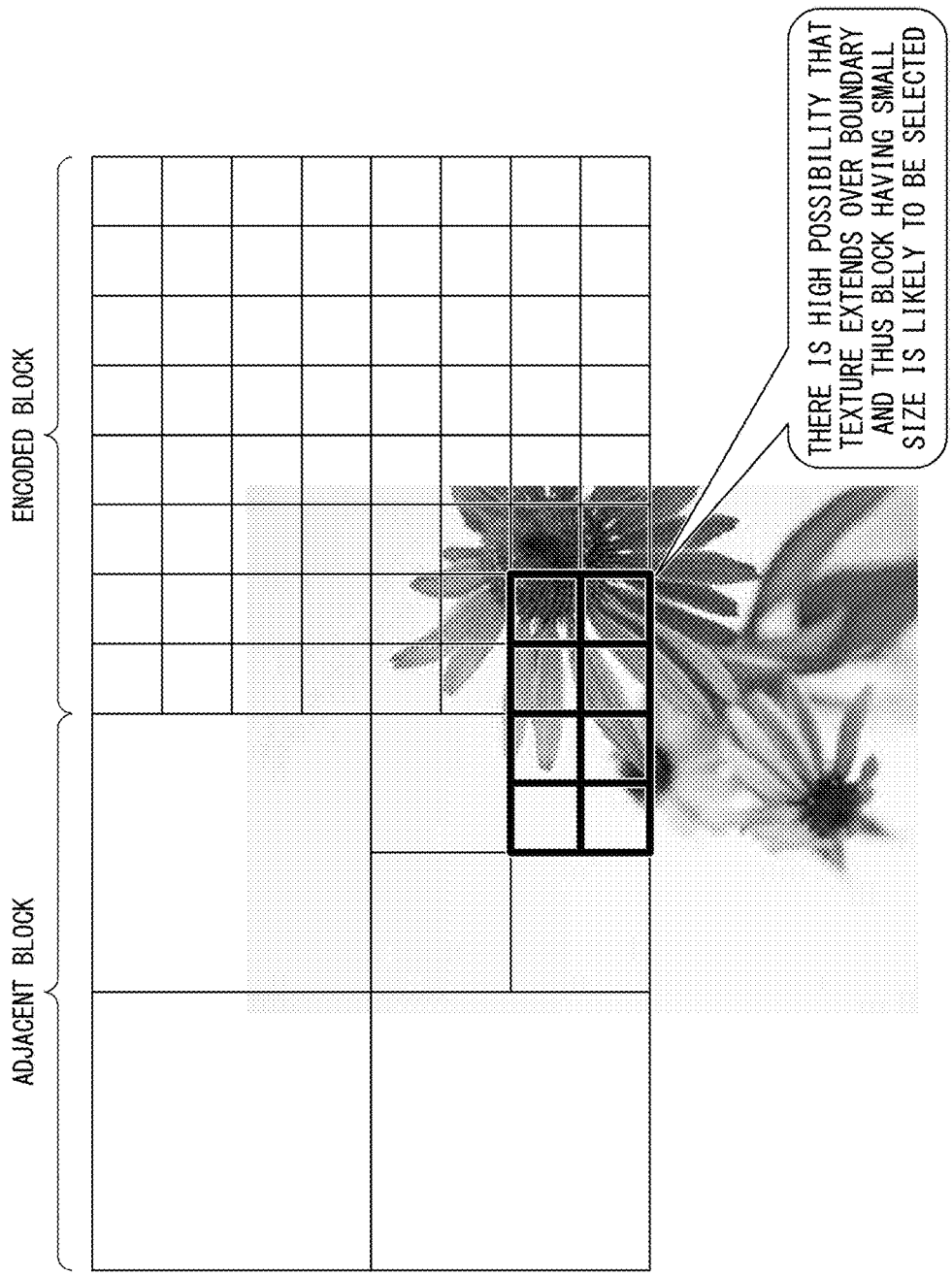
FIG. 13 is a diagram describing an effect of the block size determination process in each embodiment.

For example, if a block having a small block size is included in an adjacent encoded block as illustrated in FIG. 13, a texture region is likely to be present in its region in the case of intra prediction. In this case, the small block size is likely to be selected even in the adjacent block. Likewise, even in the case of inter prediction, a region in which motion is varied is likely to be present, and thus the small block is likely to be selected. In contrast, if there is a block having a large block size, an influence on coding efficiency is small even when an excessively small block size is excluded from candidates for a block configuration because a flat region is likely to be present in the region in the case of intra prediction. Likewise, even in the case of inter prediction, the influence on the coding efficiency is small even when the excessively small block size is excluded from the candidates for the block configuration because a uniform motion region is likely to be present. Consequently, even when a block size having a difference of two or more levels from that of the smallest block among adjacent blocks is excluded from the candidates for the block configuration based on the smallest block size in the adjacent blocks, it is possible to reduce the computational complexity and load without degrading the coding efficiency. Further, when the number of layers in the block configuration of the encoding target is four or more, the reduction of the computational complexity of at least one layer is possible.

Figure 14:
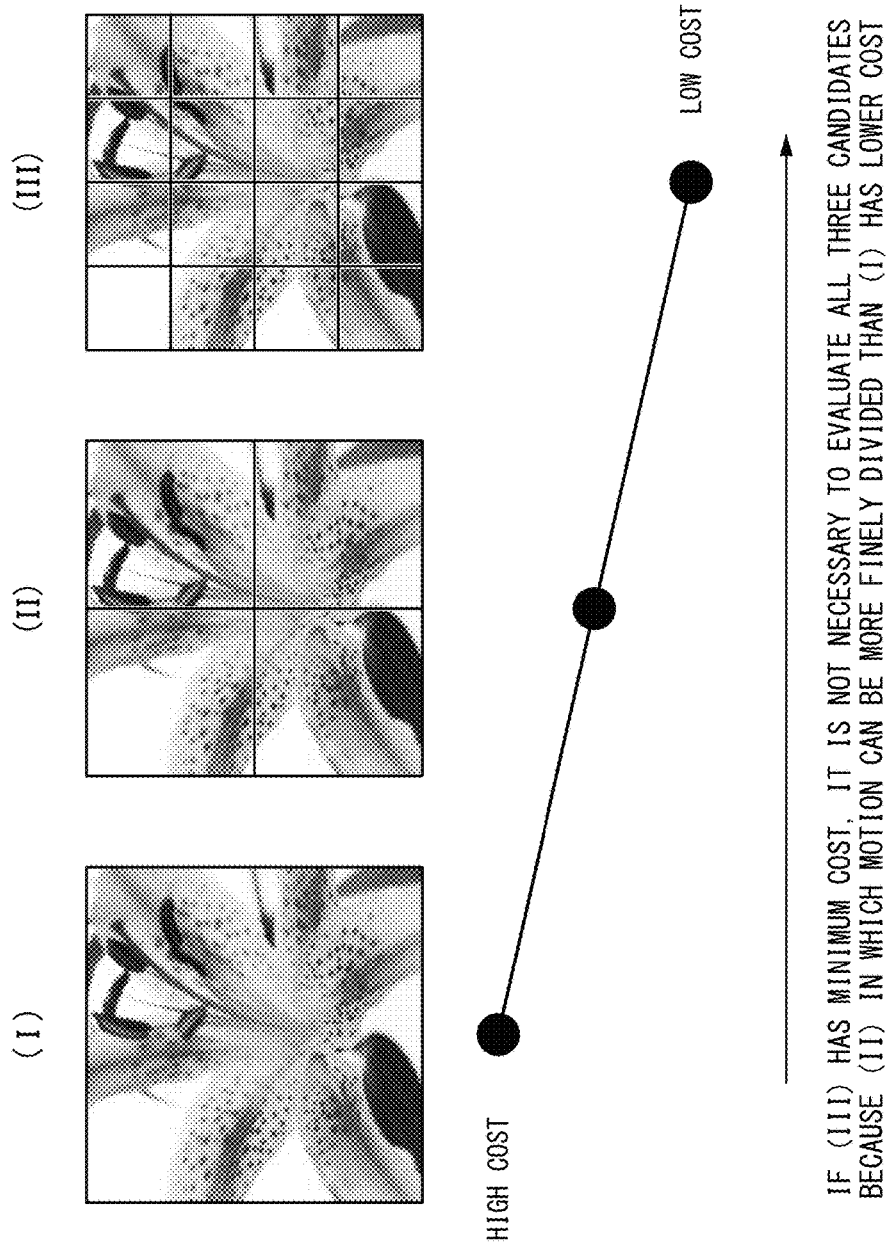
FIG. 14 is a diagram describing effects of the block size determination processes in the third and fourth embodiments.
Figure 15:
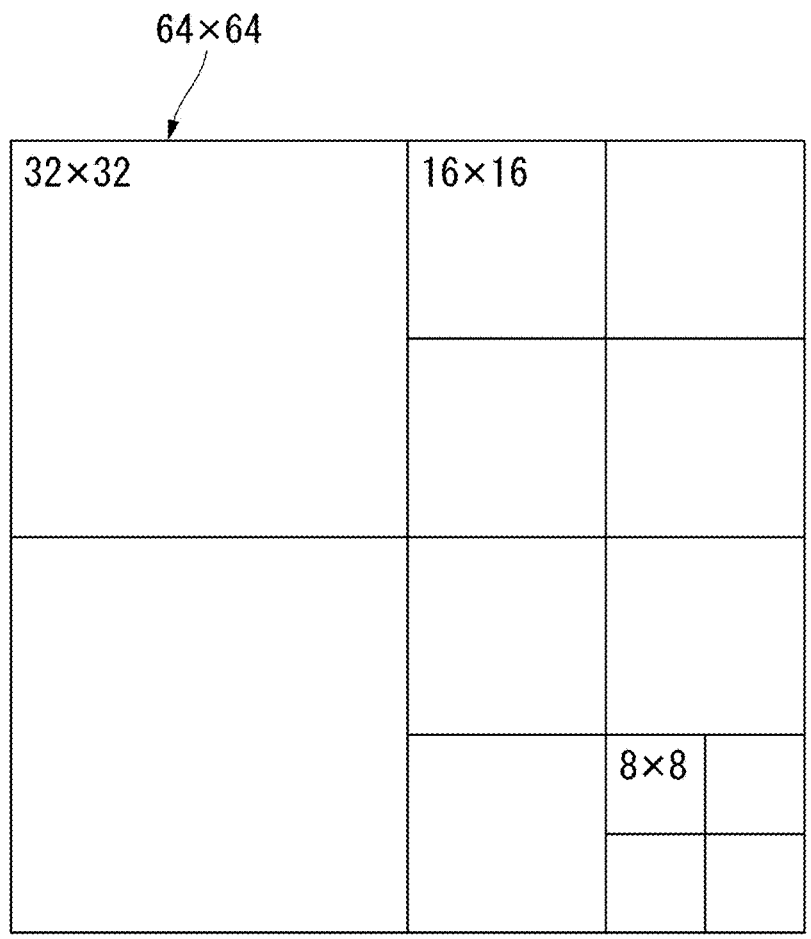
FIG. 15 is a diagram illustrating an example in which an LCU is configured by combining a plurality of CUs.

In addition, when the number of layers serving as candidates for processing is three or more as illustrated in FIG. 14 and the evaluation value is minimized in the block configuration of the smallest block size (III) among the candidates, a texture region is likely to be present if the picture type is an intra picture and a region in which motion is varied is likely to be present if the picture type is an inter picture. In such cases, the evaluation value of the block size (II) with which motion can be finely expressed is more likely to be smaller than that of the largest block size (I) with which only one prediction or motion can be expressed for the encoding region. Thus, after evaluation values for two layers are calculated, rather than performing processing or calculating evaluation values for all three layers, it is determined whether to perform the processing and calculate the evaluation value for the remaining layer based on a comparison result of the evaluation values. Thereby, it is possible to reduce the computational complexity and load without degrading coding efficiency.

In addition, when the smallest block size of the blocks adjacent to the target block is 64×64 or 32×32, the block size determination process is started after setting the initial target block to a 64×64 block. Thereby, it is possible to reduce computation such as a determination process in the block size determination process and further reduce the computational complexity and load. In addition, when the smallest block size of the blocks adjacent to the target block is not 64×64 and 32×32, the block size determination process is started after setting the initial target block to an 8×8 block. Thereby, it is possible to reduce computation such as the determination process in the block size determination process and further reduce the computational complexity and load.

In addition, because prediction is accurate in a region in which motion between frames is not complex even a large block size is used when the picture type is the inter picture, the large block size is likely to be selected and it is possible to reduce the number of loop processes by similarly performing evaluation in order from a larger block size. In addition, because the determination for aborting processing for the blocks is added to the block size determination process shown in the third embodiment, it is possible to further reduce the computational complexity and load and achieve an increase in the speed. In addition, because a small block size is normally likely to be selected when the picture type is the intra picture, it is possible to reduce the computational complexity and load by performing processing in order from a smaller block size as in the case of the inter picture.

The block size determination process in the above-described embodiments may be implemented by a computer. In this case, the block size determination process may be realized by recording a program for achieving the functions thereof on a computer-readable recording medium and causing a computer system to read and execute the program recorded on the recording medium. It is to be noted that the "computer system" used here is assumed to include an operating system (OS) and hardware such as peripheral devices. In addition, the "computer-readable recording medium" refers to a portable medium such as a flexible disk, a magneto-optical disc, a read only memory (ROM), or a compact disc (CD)-ROM, and a storage apparatus such as a hard disk embedded in the computer system. Further, the "computer-readable recording medium" is assumed to include a computer-readable recording medium for dynamically holding a program for a short time as in a communication line when the program is transmitted via a network such as the Internet or a communication circuit such as a telephone circuit and a computer-readable recording medium for holding the program for a predetermined time as in a volatile memory inside the computer system serving as a server or a client. In addition, the above program may realize part of the above-described functions, it may implement the above-described functions in combination with a program already recorded on the computer system, or the above-described functions may be implemented using hardware such as a programmable logic device (PLD) or a field programmable gate array (FPGA).

Although the embodiments of the present invention have been described in detail with reference to the drawings, the specific configurations are not limited to the embodiments and designs and the like may also be included without departing from the gist of the present invention. For example, because a description has been given for the case in which the present invention is applied to HEVC, a process of expressing the block configuration of the encoding target block using a combination of blocks from 64×64 to 8×8 has been described. However, a block size of five or more layers rather than a block size of four layers may be used as a processing target. In addition, although a description has been given for the case in which the encoding target block is recursively divided into four equal parts, a hierarchical structure in which the encoding target block is recursively divided into n parts may be used as a processing target.

INDUSTRIAL APPLICABILITY

The present invention is applicable to, for example, a process of determining a block configuration for an encoding target block having a hierarchical structure in which a region is recursively divided.

DESCRIPTION OF REFERENCE SIGNS

100, 200 Video encoding apparatus
101 Intra prediction unit
102 Inter prediction unit
103 Intra/inter-selection switch
104 Prediction residual signal generating unit
105 Orthogonal transform/quantization unit
106 Inverse quantization/inverse orthogonal transform unit
107 Restored signal generating unit
108 Loop filter unit
109 Decoded picture memory
110, 210 Block size determining unit
111 Variable length encoding unit
211 Block size determination process switching unit

The invention claimed is:
1. A video encoding apparatus which determines sizes of blocks constituting a region within an encoding target block for encoding target blocks into which an image region is divided in video encoding, the video encoding apparatus comprising:

a block selecting unit which selects each of blocks obtained by recursively dividing the encoding target block as a target block in a predetermined sequence;
a block size acquiring unit which acquires the smallest block size in an adjacent block for the selected target block;
an evaluation value calculating unit which calculates an evaluation value of the target block if a block size of the target block matches any one of the acquired block size, the block size one level higher than the acquired block size, and the block size one level lower than the acquired block size; and
a block configuration determining unit which determines a combination of the blocks constituting the region within the encoding target block based on the evaluation value.

2. The video encoding apparatus according to claim 1, wherein the sequence is a sequence which starts from the largest block size in the encoding target block, and
the video encoding apparatus further comprises:
a sum calculating unit which calculates evaluation values of blocks into which the target block is divided and calculates a sum of the calculated evaluation values; and
a calculation target excluding unit which excludes blocks obtained by dividing the target block from calculation targets of the evaluation values if the evaluation value of the target block is less than the sum.

3. The video encoding apparatus according to claim 2, wherein the sequence is a first sequence which starts from the largest block size in the encoding target block or a second sequence which starts from the smallest block size in the encoding target block, and
the block selecting unit determines which of the first sequence and the second sequence is to be used for selecting the target block based on the smallest block size in a block adjacent to the encoding target block.

4. The video encoding apparatus according to claim 2, wherein the sequence is a first sequence which starts from the largest block size in the encoding target block or a second sequence which starts from the smallest block size in the encoding target block, and
the block selecting unit determines which of the first sequence and the second sequence is to be used for selecting the target block based on a picture type of the encoding target block.

5. The video encoding apparatus according to claim 1, wherein the sequence is a sequence which starts from the smallest block size in the encoding target block, and
the video encoding apparatus further comprises:
a combination determining unit which determines a combination of blocks constituting a region within the target block based on the evaluation value; and
a calculation target excluding unit which excludes a block which includes the target block and is present in a layer higher than that of the target block from a calculation target of the evaluation value if the determined combination of the blocks within the target block is a combination of a plurality of blocks into which the target block is divided.

6. The video encoding apparatus according to claim 5, wherein the sequence is a first sequence which starts from the largest block size in the encoding target block or a second sequence which starts from the smallest block size in the encoding target block, and
the block selecting unit determines which of the first sequence and the second sequence is to be used for selecting the target block based on the smallest block size in a block adjacent to the encoding target block.

7. The video encoding apparatus according to claim 5, wherein the sequence is a first sequence which starts from the largest block size in the encoding target block or a second sequence which starts from the smallest block size in the encoding target block, and
the block selecting unit determines which of the first sequence and the second sequence is to be used for selecting the target block based on a picture type of the encoding target block.

8. The video encoding apparatus according to claim 1, wherein the sequence is a first sequence which starts from the largest block size in the encoding target block or a second sequence which starts from the smallest block size in the encoding target block, and
the block selecting unit determines which of the first sequence and the second sequence is to be used for selecting the target block based on the smallest block size in a block adjacent to the encoding target block.

9. The video encoding apparatus according to claim 1, wherein the sequence is a first sequence which starts from the largest block size in the encoding target block or a second sequence which starts from the smallest block size in the encoding target block, and
the block selecting unit determines which of the first sequence and the second sequence is to be used for selecting the target block based on a picture type of the encoding target block.

10. A block size determination method for determining sizes of blocks constituting a region within an encoding target block for encoding target blocks into which an image region is divided in video encoding, the block size determination method comprising:
a step of selecting each of blocks obtained by recursively dividing the encoding target block as a target block in a predetermined sequence;
a step of acquiring the smallest block size in an adjacent block for the selected target block;
a step of calculating an evaluation value of the target block if a block size of the target block matches any one of the acquired block size, the block size one level higher than the acquired block size, and the block size one level lower than the acquired block size; and
a step of determining a combination of the blocks constituting the region within the encoding target block based on the evaluation value.

11. A program for causing a computer to execute the block size determination method according to claim 10.

* * * * *